No. 832,287. PATENTED OCT. 2, 1906.
S. BEACH.
FAUCET OPENING SEAL AND ATTACHABLE FAUCET FOR CANS.
APPLICATION FILED MAY 1, 1905.
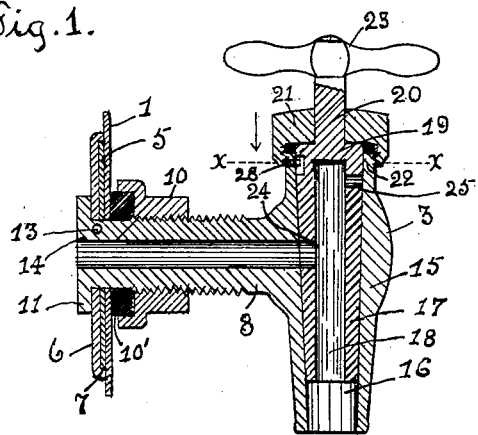
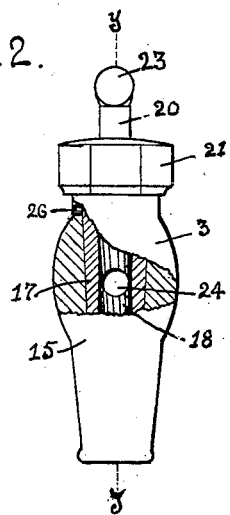
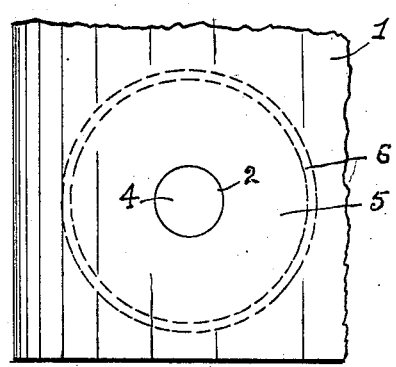
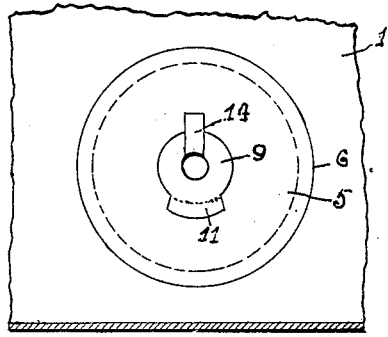
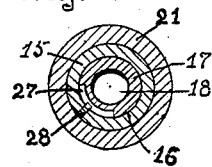
Witnesses
Chas. A Boaser
Grace Condrick
Inventor.
Seth Beach
by Robt. B. Wilson
Attorney

UNITED STATES PATENT OFFICE.

SETH BEACH, OF TOLEDO, OHIO.

FAUCET-OPENING SEAL AND ATTACHABLE FAUCET FOR CANS.

No. 832,287.   Specification of Letters Patent.   Patented Oct. 2, 1906.

Application filed May 1, 1905. Serial No. 258,146.

*To all whom it may concern:*

Be it known that I, SETH BEACH, a citizen of the United States, residing at Toledo, in the county of Lucas and State of Ohio, have invented a new and useful Improvement in Faucet-Opening Seals and Attachable Faucets for Cans, of which the following is a specification.

My invention relates to a sealed faucet-opening for cans and a faucet for the opening, and has for its object to provide in constructing a can for liquids a sealed-up opening for the attachment of a faucet and also to provide a faucet that is normally disconnected from the can and adapted to be inserted in the opening when a portion of the seal is removed and that is readily secured and packed in the opening and as readily detached therefrom, the seal for the opening having a portion that is readily removable to leave the opening free for the attachment of the faucet to the can and a permanent portion that forms a reinforcement for the wall around the opening and that is adapted to be engaged by the faucet and provide a means for its secure attachment to the can. I accomplish these objects by providing a can having a faucet-opening with a seal closing the opening and a detached faucet constructed and attachable in the opening, as hereinafter described, and illustrated in the drawings, in which—

Figure 1 is a vertical section on line *y y* of Fig. 2 of a can-wall and the seal central through the faucet-opening and through the faucet attached to the can in the opening with the faucet open. Fig. 2 is a front elevation of the faucet in open position and with a portion of the wall of the faucet broken away. Fig. 3 shows a vertical longitudinal section of a broken-away portion of the spigot of the faucet in position, illustrating the introduction of the spigot in the spigot-opening. Fig. 4 is an outside view of the can-seal unbroken and closing the opening. Fig. 5 is an inner view of the faucet attached to the can, and Fig. 6 is a cross-section of the faucet on line *x x* of Fig. 1.

In the drawings, 1 represents the wall of a can-body, and 2 a circular opening in the wall for the attachment of the faucet 3. To the inner face of the wall 1 is secured concentric to and closing the opening the seal 4, comprising the thin metallic disk 5, preferably of taggers tin, having a diameter greater than the diameter of the opening, and the disk-ring 6, having a concentric rabbet on one side of a diameter and depth to receive the disk 5 flush with the face of the ring. The orifice 7 of the ring is of equal diameter with opening 2 of the can-wall, and the outer face of the ring is slightly curved to closely fit the inner face of the wall 1. In securing the seal thus formed to the wall the disk 5 is placed next to the wall, with the orifice of the ring 6 in axial alinement with the opening 2, and the seal thus covering and closing the opening is soldered to the wall of the can.

The spigot 8 of the faucet 3 at its outer end portion 9 is of a diameter slightly less than the wall-opening 2, and the inner portion is of slightly greater diameter and threaded to receive a packing-nut 10, which is mounted thereon. The outer end of the spigot is provided at the bottom portion relative to a vertical position of the faucet for use with a radial flange 11, extending through an arc the chord of which is less than the diameter of the end of the spigot, and the upper portion is provided with a longitudinal incut 12, extending through to the bore of the spigot for a distance, and the inner end of the incut is inclined rearward and upward. In the incut 12 is pivotally mounted by a pin 13 transverse the slot a hook 14, having a body portion adapted in form and size to movably fit into the incut and take the place of a cut-away portion of the spigot and a hook portion extending outward in the plane of the radial flange 11 when the body portion is parallel with the sides of the slot, but which is of a weight to overbalance the inner end body portion, so that it normally drops downward into the bore of the spigot, as shown in Fig. 3.

The faucet 3 is provided with a valve-body 15, which is transverse the spigot, and is provided with a tapered bore 16, which intersects the bore of the spigot, and in the bore is rotatably fitted the tapered valve 17, having a longitudinal socket-bore 18, extending through the lower end toward and near to the top end 19, which is provided with the stem 20, extending upward axially to the valve through a central orifice in a cap 21, which is interiorly threaded to be run into engagement with the exteriorly-threaded upper end portion 22 of the valve-body. On the upper end of the stem is mounted a suitable handle 23 for rotating the valve. The valve 17 is provided with a port 24, which is adapted to be brought into and out of register with the bore of the spigot, and with an air-vent 25, located above and radially at ninety degrees from the port 24.

In the horizontal plane of the port 25 the valve-body is provided with an air-vent 26, which is located in the vertical plane of the axis of the spigot, so that when the port 24 of the valve is in register with the bore of the spigot the vent 25 is out of register with the vent 26, and when the valve is turned ninety degrees the port 24 is closed and the vents 24 and 26 are brought into register.

In the top portion of the valve a slot 27, extending ninety degrees of its periphery, is provided, into which extends a stop-pin 28, secured to the valve-body, whereby the valve is limited to rotate one-quarter turn only and at the limit of its movement in one direction to bring the port 24 into register with the spigot-bore and in the other direction to bring the vents 25 and 26 into register.

The packing-nut 10 is provided with a cupped enlargement toward the free end of the spigot, in which is inclosed the packing-ring 10′ and which is of greater thickness than the depth of the cup and of greater diameter than the opening of the can-wall.

Cans thus constructed and filled with liquid and the faucets therefor may be shipped as separate packages with greater security against leakage and in more compact packages than is possible with the faucets attached to the cans.

To attach a faucet to a can, the can is laid on its side with the opening uppermost, in which position the portion of the seal-disk 5, exposed by the opening, may be readily cut through around the circumference of the opening and removed. The spigot of the faucet is then inserted, as shown in Fig. 3, by holding the spigot at an acute angle to the wall of the can and first inserting the flange 11. The spigot then being brought into alinement with the opening, it is pushed into the opening until the outer wall of the can engages and presses the body portion of the hook 14 within the incut 12. When in this position, by running the nut 10 outward on the spigot the packing 10′ is first pushed over the body portion of the hook in position to confine it in the incut, and as the packing is compressed on the body of the can the flange 11 and the hook portion of the hook 14 is tightly compressed on the ring 6 of the seal, thereby securely attaching the faucet to the can and packing the spigot in the opening. The ring 6 adds greatly to the strength of the attachment and permits increased compression of the nut and packing on the wall without injury thereto.

By providing the valve-body and the valve with air-vents that are adapted to be brought into register when the valve is closed the liquid in the valve and in nozzle of the valve-body, which would otherwise be held therein by vacuum-pressure, is permitted to flow freely therefrom, thereby preventing the loss and slow dripping of the liquid from the faucet after being closed and after the vessel for receiving it has been withdrawn.

What I claim to be new is—

The combination with a can provided with a spigot-opening, of a seal for the opening, comprising a reinforcing disk-ring having a concentric rabbet in one face and a central opening of equal diameter with the can-opening, and a thin metallic disk mounted in the rabbet of the ring flush with its face; a faucet having a spigot adapted to fit the spigot-opening of the can, said spigot having an inner threaded portion and an outer end portion provided with a radial flange extending the area of the end on one side, and a longitudinal incut opposite the radial flange through the spigot-wall to the bore having parallel sides and extending a greater distance on the outside than on the inside of the wall to form an inclined shoulder; a pin transverse the incut; a hook pivoted on the pin in the incut, having a body portion adapted to fill the incut, and a hook portion adapted to be extended in the plane of the radial flange and oppositely thereto when the body portion of the hook is in position to fill the incut, and to be swung into line with the bore of the spigot, when the body of the hook is transverse the incut; a cupped packing-nut mounted on the threaded portion of the spigot; and a packing-gland in the cup of the nut, adapted to be compressed by the nut on the can-body and the spigot around the can-opening.

In witness whereof I have hereunto signed my name, in the presence of two subscribing witnesses, this 29th day of April, 1905.

SETH BEACH.

Witnesses:
  V. W. MOREHOUSE,
  GRACE COWDRICH.